Aug. 17, 1937.  D. C. PRINCE  2,090,518
ELECTRICAL SWITCH GEAR
Filed Oct. 20, 1934
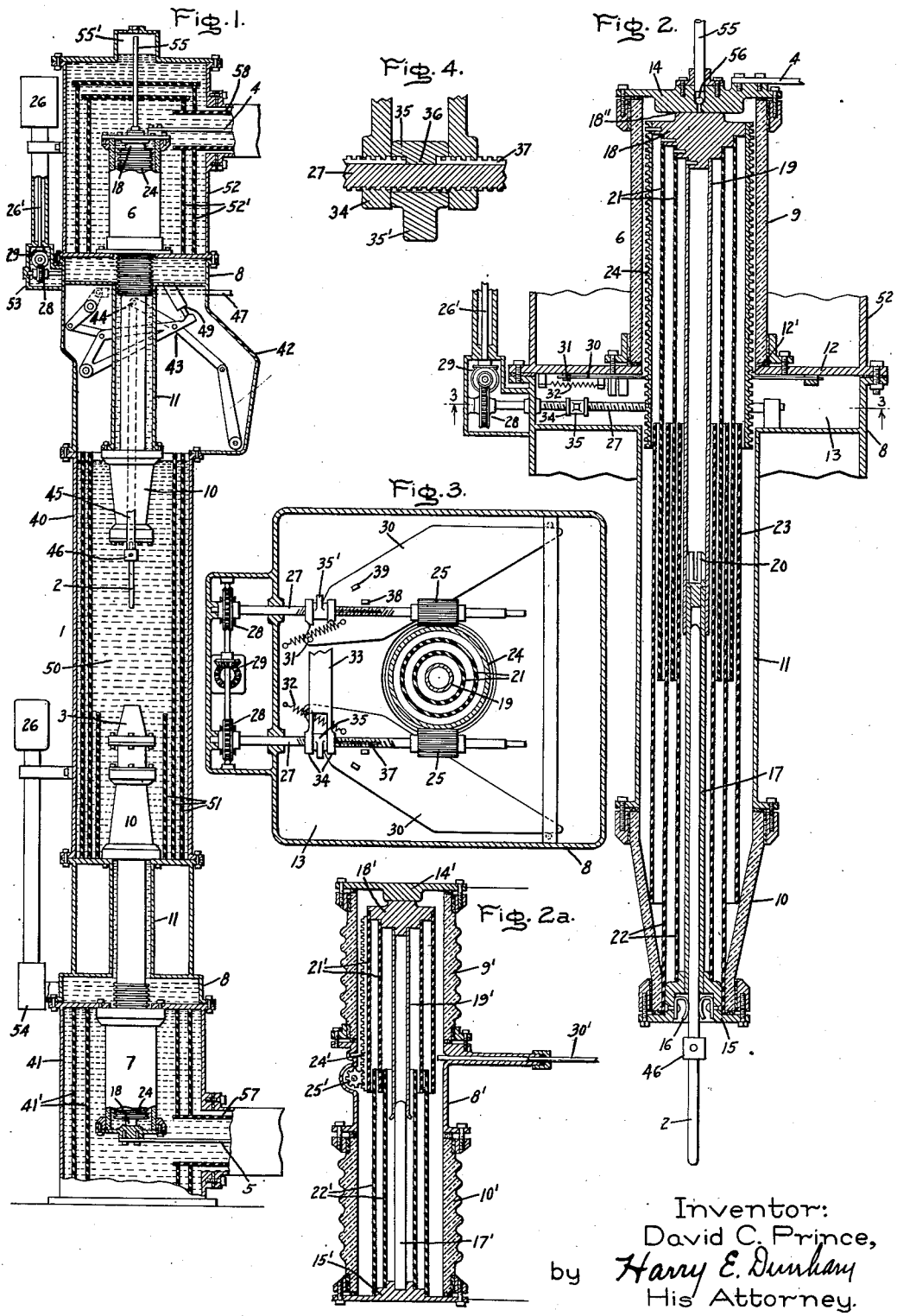
Inventor:
David C. Prince,
by Harry E. Dunham
His Attorney.

Patented Aug. 17, 1937

2,090,518

UNITED STATES PATENT OFFICE 2,090,518

ELECTRICAL SWITCH GEAR

David C. Prince, Swarthmore, Pa., assignor to General Electric Company, a corporation of New York Application October 20, 1934, Serial No. 749,206

7 Claims. (Cl. 200—48)

My invention relates to electrical switchgear, more particularly to switchgear of the metal clad type for high tension power circuits, and has for its principal object the provision of improved switchgear of the aforesaid type having means for disconnecting and isolating a circuit breaker with respect to associated circuits which shall be electrically efficient and compact and economical in design.

My invention will be more fully set forth in the following description referring to the accompanying drawing, and the features of novelty which characterize my invention will be pointed out with particularity in the claims annexed to and forming a part of this specification.

Referring to the drawing, Fig. 1 is an elevational view, partly in section, of a single phase switchgear unit embodying my invention; Fig. 2 is an enlarged sectional view of one of the lead-in conductor bushings including the disconnecting and isolating apparatus shown in Fig. 1; Fig. 2a is a sectional view of similar apparatus of more general application embodying my invention; Fig. 3 is a sectional plan view taken along the lines 3—3 of Fig. 2, and Fig. 4 is a detailed view in section of a part of the switchgear structure shown in Fig. 3.

The single phase switchgear unit for a polyphase metal clad bus and switch station illustrated by Fig. 1 comprises a circuit breaker of suitable design and interrupting capacity, as a single-break oil circuit breaker 1 of the well-known oil blast type, and means hereinafter described for disconnecting and isolating the same with respect to the associated circuit. The relatively movable contact structure of the circuit breaker includes a vertically movable rod contact 2 which is connected to one terminal of the breaker and coacting stationary contact structure 3 which is connected to the other terminal of the breaker.

The circuit controlled by the breaker includes a power supply conductor, as a busbar 4 connected to the upper part of the unit, and a branch conductor, as a feeder 5 connected to the lower part of said unit. The terminals of the circuit breaker 1, when the circuit breaker is in the open circuit position shown, are disconnected and electrically isolated with respect to the busbar 4 and feeder 5 by disconnecting and isolating means incorporated in the lead-in conductor bushings 6 and 7, respectively. For reasons well known in the art, both terminals of a circuit breaker are preferably disconnected and electrically isolated with respect to the associated circuits when the circuit breaker is to be inspected or repaired.

A preferred practice is to disconnect each terminal of the breaker with respect to its associated circuit by a disconnect switch, ground the disconnect switch member which is connected to the breaker terminal, and interpose a grounded shutter or the like between the disconnect switch contact members so that said members are electrically isolated with respect to each other.

In previous designs the above described arrangement generally resulted in comparatively large and expensive structures in order to provide adequate insulation for the higher voltages. For example, the high voltage bushings alone in such designs occupied considerable space and contributed considerably to the cost of the gear.

In accordance with my invention the disconnecting and isolating device is operated in and forms a part of the high voltage bushing for each lead-in conductor or terminal of the circuit breaker.

Referring more particularly to Figs. 1 and 2, the upper lead-in conductor bushing 6, for example, comprises an intermediate metallic casing 8 which is grounded and which carries at the opposite ends thereof insulating sleeves 9 and 10. The casing 8, which is incorporated in the switchgear unit in a manner hereinafter described, comprises a depending cylindrical portion 11 to which the lower insulator 10 is secured. A plate 12 having a central aperture 12' is mounted on the casing 8 and supports the upper insulator 9. The casing 8 forms with plate 12 a compartment 13 within which the isolating and grounding means are disposed.

The stationary terminals of the disconnecting device (Fig. 2) comprise a contact cap 14 suitably mounted on the insulator 9 and connected, as illustrated, to the busbar 4 and a lower terminal contact 15 suitably mounted on the lower insulator 10 and in sliding electrical contact, as at 16, with the circuit breaker contact 2. The terminal contact 15 has likewise secured and electrically connected thereto a fixed conducting sleeve 17 which extends axially of the insulator 10 and sleeve 11. The breaker contact 2 is guided for reciprocal movement within said sleeve and is electrically connected thereto as illustrated.

The movable element of the disconnecting device comprises a contact member 18 adapted to make butt contact at 18″ with the terminal cap 14. A conducting sleeve 19 is secured and electrically connected to the contact 18 and extends axially of the insulator 9 and casing cylinder 11 so as to have telescopic engagement with the lower stationary sleeve 17. Good contact engagement is obtained between the conducting sleeves 17 and 19 as by a contact 20 carried by the sleeve 17 and slotted for the purpose of providing a resilient contact.

It will be apparent from the above description that operation of the rod contact 2 does not break the electrical connection between the movable contact 18 of the disconnecting switch and the breaker terminal and that the upper breaker terminal is disconnected from the busbar 4 by lowering of the disconnect contact 18.

For the purpose of insulating the bushing and disconnecting device with respect to high voltages, the movable contact 18 has depending therefrom spaced, concentrically arranged insulating sleeves 21 and the lower terminal structure at 15 supports similarly arranged insulating sleeves 22. The insulating sleeves 21 and 22 overlap at their free ends and extend in telescopic relation to each other as illustrated. An outer fixed insulating sleeve 23 extending throughout the casing cylinder 11 is likewise employed. Accordingly in the closed circuit position the current conductors extending centrally of the bushing are insulated for high potentials throughout the length of the bushing. As used herein, the term "bushing" is intended to embrace structure for enclosing and insulating the high-tension lead-in conductor at a terminal of the circuit breaker.

The operating means for the movable contact 18 of the disconnecting device comprises in the present instance a motor actuated gear and rack. Referring particularly to Figs. 2 and 3, the contact 18 has secured thereto a rack 24 which is cylindrical in form and extends through the insulator 19 into the casing 8. As best illustrated by Fig. 3, the rack 24 is driven by a pair of gears 25 which are connected to a motor 26 through drive shaft 26', parallel gear shafts 27 and gearing 28 and 29. Accordingly rotation of the motor drive shaft 26' causes lowering or elevation of the disconnect contact 18.

In addition to actuating the contact 18 the motor operates the metallic isolating shutters 30 disposed in the compartment 13. Each shutter 30 comprises a plate-like member pivotally mounted at 31 on the grounded casing 8 and shaped so as to completely close the lower end of the insulator 9 when the disconnect contact 18 is lowered below that point and the shutters are brought together. Each shutter is likewise provided with an overcenter spring 32 tending to actuate the shutters by snap action and to hold the shutters in either completely open or closed position.

The shutter actuating means comprises a bar 33 which is forked at its opposite ends at 34. The forked portions 34 are in screw-threaded engagement, as illustrated by Fig. 4, with the shafts 27 so that the bar 33 moves transversely during rotation of said shafts. Mounted between the forked members 34 are rotatable members as traveling sleeves 35 freely movable for longitudinal movement on the shafts 27 but keyed, as at 36, in a longitudinal slot 37 with respect to relative rotation. Each sleeve 35 is provided with an offset lug 35' for coacting with the corresponding shutter.

The thread arrangement on the shafts 27 is such that the lugs 35' rotate away from each other, as viewed in Fig. 3, when the disconnecting device is being opened, and towards each other when the contact 18 is being elevated to closed position. Accordingly, the shutters 30 are provided with lugs 38 arranged to be engaged by the rotating lugs 35' when the contact 18 is beneath the shutters for causing initial rotation of said shutters past the overcenter spring positions, the springs 32 completing the shutter closing operation. Similar shutter lugs 39 are positioned so as to be engaged by the rotating lugs 35' for opening the shutters prior to elevation of the contact 18. As above pointed out, the shutters 30 are suitably grounded to the casing 8 so that when disconnect contact 18 is beneath the closed shutters the contacts 14 and 18 are electrically isolated. In this position the contact 18 may likewise be independently grounded, if desired, to the casing 8.

The lead-in conductor bushing and disconnecting device above described are particularly adapted for circuit breakers of the single-break type as illustrated. With this arrangement the movable rod contact of the circuit breaker may telescope or be guided within the lead-in conductor bushing so as to decrease the overall height of the switchgear. Where the lead-in conductor bushings are disposed in vertical alinement in the upper and lower ends of a circuit breaker tank or casing, the above-described arrangement furthermore provides a direct and substantially straight conducting path through the casing which is highly desirable because of the resulting simplicity and compactness in design.

Fig. 2a illustrates a combined lead-in conductor bushing and disconnecting and isolating device for more general application, as for example to the well known double-break oil circuit breaker. The bushing comprises an intermediate metallic casing 8' at the opposite ends of which are secured insulators 9' and 10'. Conducting terminal caps 14' and 15' are mounted on the aforesaid insulators at the opposite ends of the bushing. The intermediate casing 8' may be suitably mounted and grounded with respect to the cover structure of the circuit breaker so that the lead-in conductor bushing extends through said cover structure. Accordingly, the line conductor is connected to the terminal cap 14' and the movable contact structure of the circuit breaker coacts with the lower terminal 15'.

The movable contact 18' of the disconnecting device is provided with a conducting sleeve 19' which is slidable on the conducting guide rod 17' which is in turn fixed and electrically connected to the lower terminal 15'. As in the previous instance, the movable contact 18' has mounted for movement therewith concentric insulating sleeves 21' telescoping with the coacting fixed insulating sleeves 22'.

The movable disconnect contact 18' may be raised and lowered by a suitable rack and gear arrangement 24'—25'. When the contact 18' is in its completely open circuit position within the grounded casing 8' the shutter 30', which is electrically connected to casing 8', may be slid across the top of the casing over said disconnect contact electrically to isolate the same with respect to the upper terminal contact 14'. Suitable actuating means for the shutter and movable disconnect contact may be provided.

The complete switchgear unit is vertically arranged as illustrated by Fig. 1, the cylindrical circuit breaker casing 40 being vertically positioned and mounted at its lower end on one of the grounded casings 8. The base structure comprises a cylindrical casing 41 forming a terminal and junction chamber for the lower bushing and disconnecting device 7 and feeder 5. At the upper part of the circuit breaker casing 40 is mounted a mechanism casing 42 forming in the present instance part of casing 8. The casing 42 houses linkage structure 43 connected, as at 44, to a pair of members 45 offset with respect to the lead-in bushing 6, and connected at 46 to opposite sides of the rod contact.

The breaker actuating means (not shown) is connected to an actuating rod 47, reciprocal movement of which causes opening and closing movement of the rod contact 2 through the linkage 43. Suitable buffer structure 49 cooperates with the linkage 43 for absorbing the opening shock. Closing of the breaker is effected by lowering of the rod contact 2 into engagement with the stationary contact structure 3. The contact structure 3 may be of any suitable type, as for example of the oil-blast type, wherein a baffle arrangement causes an oil blast through the arc upon separation of the contacts. The breaker casing is filled with a suitable insulating and arc extinguishing liquid 50, as oil, to the level indicated and is provided with a plurality of concentrically arranged cylindrical insulating liners 51.

Above the upper casing 8 is mounted a terminal and junction casing 52 similar to 41, from which the busbar 4 is led. The casings 41 and 52 are each oil filled, as illustrated, and are provided with cylindrical insulating liners 41' and 52'. The disconnecting devices at 6 and 7 are likewise oil filled so that the disconnect contacts are likewise insulated by oil in the open circuit position.

The casing 52 likewise supports the motor 26 and mechanism casing 53 associated with the above described disconnecting device and shutter. A similar motor 26 is likewise connected to mechanism at 54 for simultaneously operating the lower disconnecting device which is generally similar to the upper disconnecting device described except for the fact that it is in inverted position.

It will be observed that the above-described arrangement provides a straight and direct conducting path for the circuit through the complete switchgear unit. This path is not only completely insulated by comparatively few insulating elements but is appreciably shortened and simplified by incorporating the disconnecting and isolating device in the upper and lower lead-in conductor bushings.

For the purpose of venting gas formed in the disconnecting device a tube 55 (Figs. 1 and 2) is connected to the terminal cap 14 and extends into the expansion chamber 55' formed at the upper part of the casing 52. A ball valve 56 serves to close the vent passage when no gas pressure is present.

In operating the switchgear to open and close the circuit and perform the disconnecting and isolating operations, the circuit breaker mechanism is suitably interlocked with respect to the energizing circuits of the motors 26 so that opening of the disconnecting devices is preceded by opening of the circuit breaker and closing of the circuit breaker is preceded by closing of the disconnecting devices according to well known and established practice in the art. Accordingly, upon opening of the circuit breaker 1 the disconnecting devices at 6 and 7 are subsequently operated, as previously described, to disconnect and isolate the breaker terminals with respect to the busbar and feeder. With the apparatus in the open circuit, disconnected and isolated position the circuit breaker 1 may be entered for inspection or repair without danger.

The exterior circuits of the switchgear may be suitably arranged and form no part of the present invention. The feeder 5 extends from the casing 41, as through an insulated pipe 57. The feeder conductor 5 may extend into a lower cable vault and may be associated with means for providing the usual potential and current transformer connections. The busbar 4 extends from the casing 52 through a similar insulated pipe 58. In a three phase arrangement three similar switchgear units are placed side by side with the busbars mounted at the upper parts of the units, as indicated, and extending parallel with respect to each other.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. Electrical switchgear including a circuit breaker having a lead-in conductor bushing, a movable rod contact and coacting stationary contact structure, relatively movable disconnect contacts in series with said circuit breaker operable within said bushing, and means guiding said rod contact for reciprocal movement within said bushing, said rod contact being electrically connected in sliding relation to one of said disconnect contacts and separately operable with respect to said disconnect contact.

2. Electrical switchgear comprising a circuit breaker having a casing, a lead-in conductor bushing extending within said casing, relatively movable disconnect contacts operable within said bushing, stationary current interrupting contact structure disposed at the lower part of said casing, and a coacting rod contact guided for vertical reciprocal movement in said bushing and electrically connected to one of said disconnect contacts, said disconnect contacts being operable separately with respect to and in series with said circuit breaker contact structure.

3. Electrical switchgear comprising a circuit breaker having a lead-in conductor bushing, a movable rod contact and coacting stationary contact structure, relatively movable disconnect contacts operable within said bushing, a conducting sleeve electrically connected to one of said disconnect contacts disposed within said bushing, said rod contact electrically connected to and guided for reciprocal movement within said conducting sleeve.

4. Electrical switchgear comprising a circuit breaker having a lead-in conductor bushing, a movable rod contact and coacting stationary contact structure, a fixed disconnect contact at one end of said bushing, a coacting movable disconnect contact operable within said bushing, a fixed conducting sleeve extending within said bushing from the end opposite said fixed contact, said movable disconnect contact having sliding contact with said fixed sleeve, said movable rod contact being guided for reciprocal movement within said fixed sleeve and electrically connected thereto.

5. Electrical switchgear comprising a stationary circuit breaker having a terminal lead-in conductor bushing, said bushing having an intermediate metallic grounded casing and insulators mounted at opposite ends of said casing, a stationary disconnect contact mounted at one end of said bushing on one of said insulators, a coacting movable disconnect contact mounted for reciprocal movement within said bushing, said movable contact in the completely open circuit position thereof disposed within said intermediate casing, and isolating means including a shutter disposed in said intermediate casing arranged to electrically isolate said movable disconnect contact in the completely open circuit position.

6. Electrical switchgear comprising a circuit breaker having relatively movable contact structure including a vertically movable rod contact, a pair of lead-in conductor bushings mounted respectively in opposite ends of said breaker so as to provide with said contact structure a substantially straight and vertical conducting path through said breaker, and relatively movable disconnect contacts in series with said contact structure operable longitudinally of and within each of said bushings along said straight conducting path.

7. Electrical switchgear comprising a circuit breaker having a casing, a pair of lead-in conductor bushings mounted respectively in vertical alinement at opposite ends of said casing, current interrupting contact structure disposed in said casing including stationary contact structure electrically connected to a terminal of one of said bushings at the lower part of said casing and a coacting rod contact vertically movable into the other of said bushings and electrically connected to a terminal thereof at the upper part of said casing, and relatively movable disconnect contacts operable in vertical alinement within each of said bushings for connecting and disconnecting said rod contact and stationary contact structure with respect to the associated circuit.

DAVID C. PRINCE.